United States Patent
Lee et al.

(10) Patent No.: US 8,051,457 B2
(45) Date of Patent: *Nov. 1, 2011

(54) METHOD FOR DELIVERING NON-ANONYMOUS USER METADATA USING AN SOAP OPERATION IN TV ANYTIME METADATA SERVICE

(75) Inventors: Jong Seul Lee, Sungnam (KR); Seok Pil Lee, Sungnam (KR); Tae Beom Lim, Anyang (KR); Kyoung Ro Yoon, Seoul (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,575

(22) Filed: Apr. 9, 2010

(65) Prior Publication Data

US 2010/0218229 A1 Aug. 26, 2010

Related U.S. Application Data

(63) Continuation of application No. 11/192,280, filed on Jul. 29, 2005, now Pat. No. 7,725,917.

(30) Foreign Application Priority Data

Dec. 30, 2004 (KR) .................. 10-2004-0116702
Mar. 29, 2005 (KR) .................. 10-2005-0025886

(51) Int. Cl.
*H04N 7/16* (2006.01)
(52) U.S. Cl. ...................... 725/135; 725/143
(58) Field of Classification Search .......... None
See application file for complete search history.

(56) References Cited

U.S. PATENT DOCUMENTS

| 7,073,193 | B2 | 7/2006 | Marsh | |
|---|---|---|---|---|
| 2002/0112247 | A1 | 8/2002 | Horner et al. | |
| 2003/0028451 | A1* | 2/2003 | Ananian | 705/27 |
| 2003/0028489 | A1* | 2/2003 | Williamson | 705/59 |
| 2005/0193408 | A1 | 9/2005 | Sull et al. | |
| 2005/0203792 | A1* | 9/2005 | Kuppe et al. | 705/10 |

OTHER PUBLICATIONS

Zhang, Jia, et al., "A SOAP-Oriented Component-Based Framework Supporting Device-Independent Multimedia Web Services," Proceedings of the IEEE Fourth Int'l Symp. on Multimedia Software Engineering, 2002.

(Continued)

*Primary Examiner* — Joseph P Hirl
*Assistant Examiner* — An Nguyen
(74) *Attorney, Agent, or Firm* — Sughrue Mion, PLLC

(57) ABSTRACT

The present invention relates to a method or an operation for providing a personalized TV-Anytime metadata service. According to the present invention, there is provided a method of transmitting non-anonymous user metadata to a TV-Anytime service agent using a SOAP operation, comprising the steps of a) defining a SOAP operation which transmits user metadata and is capable of identifying transmission of non-anonymous user metadata, b) the service agent identifying a user, c) a client loading user metadata about the identified user on an element of the SOAP operation defined at step a) and transmitting the element with the user metadata to the service agent, and d) the service agent identifying the element of the SOAP operation transmitted at step c) and extracting the user metadata included in the element of the SOAP operation therefrom.

6 Claims, 6 Drawing Sheets

OTHER PUBLICATIONS

ETSI TS 102 822-6-1 V1.1.1 (Oct. 2003), Broadcast and On-line Services: Search, select, and rightful use of content on personal storage systems ("TV-Anytime Phase 1"); part 6: Delivery of metadata over a bi-directional network; Sub-part 1: Service and transport.

ETSI TS 102 822-7 V1.1.1 (Oct. 2003), Broadcast and On-line Services; Search, select and rightful use of content on personal storage systems ("TV-Anytime Phase 1"); Part 7: Bi-directional metadata delivery protection.

Extensible Markup Language (XML) 1.0 (Second Edition), W3C Recommendation, Oct. 6, 2000. Editors: Bray, Paoli, Sperberg-McQueen and Maler. http://www.w3.org/TR/2000/REC-xml-20001006.

Namespaces in XML, W3C Recommendation, Jan. 14, 1999. Editors: Bray, Hollander and Layman. http://www.w3.org/TR/1999/REC-xml-names-19990114.

Requirements and Scenarios for the Bi-directional Transport of Metadata, TV150r1, The TV-Anytime Forum. http://www.tv-anytime.org.

Request for Comments: 1591. Domain Name System Structure and Delegation, J. Postel, Mar. 1994. http://www.ietf.org/rfc/rfc1591.txt.

Request for Comments: 1945. Hypertext Transfer Protocol—HTTP/1.0. Berners-Lee et al., May 1996. http://www.ietf.org/rfc/rfc1945.txt.

Request for Comments: 2119. Key words for use in RFCs to Indicate Requirement Levels. S. Bradner, Mar. 1997. http://www.ietf.org/rfc/rfc2119.txt.

Request for Comments: 2396. Uniform Resource Identifiers (URI): Generic Syntax. Berners-Lee et al., Aug. 1998. http://www.ietf.org/rfc/rfc2396.txt.

Request for Comments: 2616. Hypertext Transfer Protocol—HTTP/1.1. Fielding et al., Jun. 1999. http://www.ietf.org/rfc/rfc2616.txt.

Simple Object Access Protocol (SOAP) 1.1, W3C Note, May 8, 2000. Authors: Box, Ehnebuske, Kakivaya, Layman, Mendelsohn, Nielsen, Thatte, and Winer. http://www.w3.org/TR/2000/NOTE-SOAP-20000508.

TV-Anytime Requirements Series: R-1, TV035r6, The TV-Anytime Forum. http://www.tv-anytime.org.

TV-Anytime Specification on Content Referencing, SP004v12. Final Specification, Version 1.2. The TV-Anytime Forum. http://www.tv-anytime.org.

TV-Anytime Specification on Metadata, SP003v13. Final Specification, Version 1.3. The TV-Anytime Forum. http://www.tv-anytime.org.

TV-Anytime Specification on Metadata Protection, SP007v10. Final Specification, Version 1.0. The TV-Anytime Forum. http://www.tv-anytime.org.

TV-Anytime Specification on System, SP002v13. Final Specification, Version 1.3. The TV-Anytime Forum. http://www.tv-anytime.org.

Unicode Collation Algorithm, Unicode Technical Standard #10. Authors: Davis and Whistler. May 5, 2005. http://www.unicode.org/unicode/reports/tr10.

Unicode Normalization Forms, Unicode Standard Annex #15. Authors: David and Dürst. Mar. 25, 2005. http://www.unicode.org/unicode/reports/tr15.

Universal Description Discovery & Integration, Version 3.0. Authors: Bellwood, Clément, Ehnebuske, Hately, Hondo, Husband, Januszewski, Lee, McKee, Munter and von Riegen. Jul. 19, 2002. http://uddi.org/pubs/uddi-v.3.00-published-20020719.htm.

Web Services Description Language (WSDL), Version 1.1, W3C Note, Mar. 15, 2001. http://www.w3.org/TR/2001/NOTE-wsdl-20010315.

Web Services Inspection Language, Version 1.0. Authors: Ballinger, Brittenham, Malhotra, Nagy, and Pharies. Nov. 2001. http://www.ibm.com/developerworks/webservices/library/ws-wsilspec.html.

XML Schema, W3C Recommendation (Version 1.0). May 2, 2002. http://www.w3.org/TR/2001/REC-xmlschema-0-20010502, http://www.w3.org/TR/2001/REC-xmlschema-1-20010502, http://www.w3.org/TR/2001/REC-xmlschema-2-20010502.

The Platform for Privacy Preferences 1.0 (P3P1.0) Specification. Editor: Marchiori. Apr. 16, 2002. http://www.w3.org/TR/P3P/.

The WS-Inspection and UDDI Relationship. Authors: Nagy and Ballinger, Nov. 1, 2001. http://www-106.ibm.com/developerworks/webservices/library/ws-wsiluddi.html.

* cited by examiner

[FIG. 1]
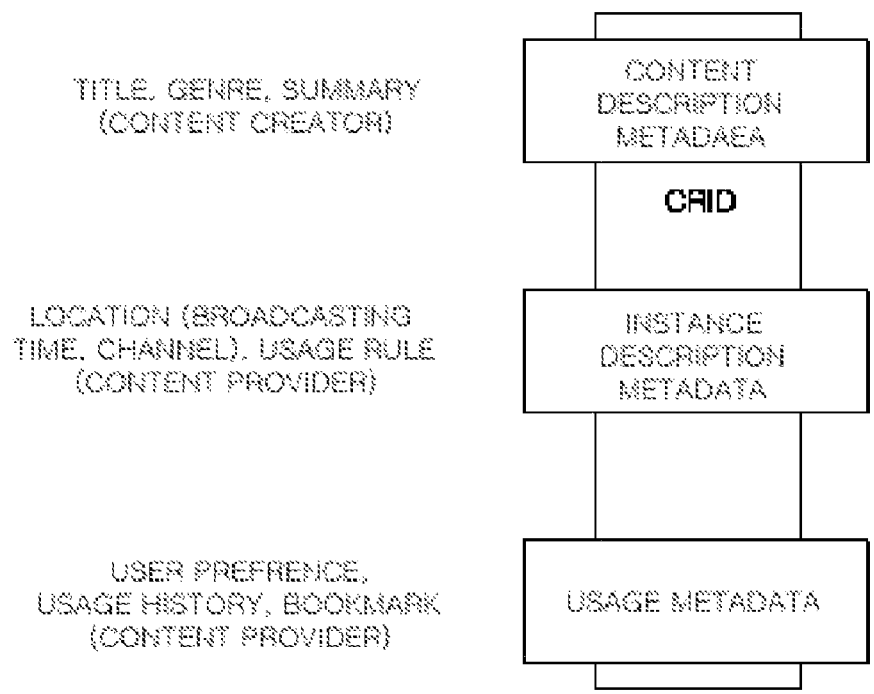
[FIG. 2]
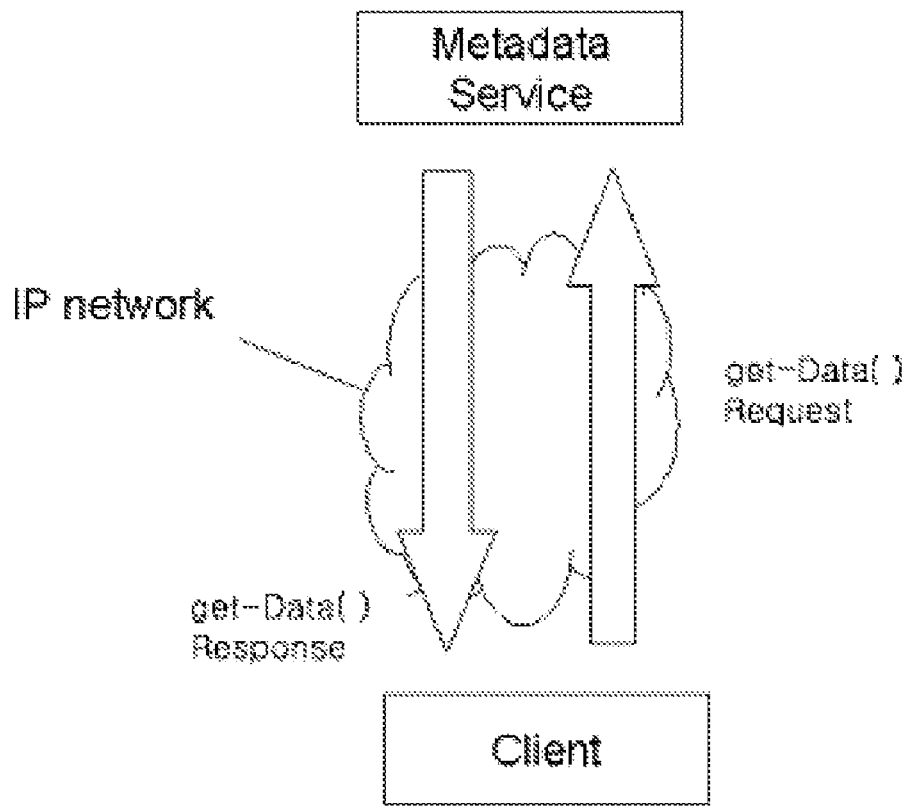

[FIG. 3]

```
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>
```

[FIG. 4]

```xml
<element name="get_Data" type="tns:get_Data"/>
  <complexType name="get_Data">
    <sequence>
      <element name="QueryConstraints">
        <complexType>
          <choice>
            <element name="PredicateBag" type="tns:PredicateBagType"/>
            <element name="BinaryPredicate" type="tns:BinaryPredicateType"/>
            <element name="UnaryPredicate" type="tns:UnaryPredicateType"/>
          </choice>
        </complexType>
      </element>
      <element name="RequestedTables" type="tns:RequestedTablesType"/>
    </sequence>
    <attribute name="maxPrograms" type="unsignedInt"/>
  </complexType>

<complexType name="RequestedTablesType">
  <sequence>
    <element name="Table" maxOccurs="unbounded">
    <complexType>
      <sequence>
<element name="SortCriteria" type="tns:SortCriteriaType" minOccurs="0" maxOccurs="unbounded"/>
      </sequence>
      <attribute name="type" use="required">
        <simpleType>
<restriction base="string">
<enumeration value="ContentReferencingTable"/>
<enumeration value="ClassificationSchemeTable"/>
<enumeration value="ProgramInformationTable"/>
<enumeration value="GroupInformationTable"/>
<enumeration value="CreditsInformationTable"/>
<enumeration value="ProgramLocationTable"/>
<enumeration value="ServiceInformationTable"/>
<enumeration value="ProgramReviewTable"/>
<enumeration value="SegmentInformationTable"/>
</restriction>
        </simpleType>
      </attribute>
    </complexType>
    </element>
  </sequence>
  </complexType>
```

[FIG. 5]

```
<element name="get_Data_Result" type="tns:get_Data_ResultType"/>
  <complexType name="get_Data_ResultType">
    <sequence>
      <element name="TableSortingInformation"
          type="tns:RequestedTablesType" minOccurs="0"/>
      <element ref="tva:TVAMain" minOccurs="0"/>
      <element ref="cr:ContentReferencingTable" minOccurs="0"/>
      <element name="InvalidFragments"
          type="tns:InvalidFragmentsType" minOccurs="0"/>
    </sequence>
    <attribute name="serviceVersion" type="unsignedInt" use="required"/>
    <attribute name="truncated" type="boolean"/>
```

[FIG. 6]

```
<element name="submit_Data" type="tns:submit_Data"/>
    <complexType name="submit_Data">
        <sequence>
            <element name="UserDescription" type="tva:UserDescriptionType" maxOccurs="unbounded"/>
        </sequence>
    </complexType>
    <!-- ################# Section 5.2.2 submit_Data output ################# -->
    <element name="submit_Data_Result" type="tns:submit_Data_Result"/>
    <complexType name="submit_Data_Result">
        <attribute name="serviceVersion" type="unsignedInt" use="required"/>
    </complexType>
```

[FIG. 7]

```
<element name="upload_Personal_Data" type="tns2:upload_Personal_Data"/>
  <complexType name="upload_Personal_Data">
<sequence>
<element name="UserDescription" type="tva:UserDescriptionType" maxOccurs="unbounded"/>
</sequence>
  </complexType>
  <element name="upload_Personal_Data_Result"
type="tns2:upload_Personal_Data_Result"/>
  <complexType name="upload_Personal_Data_Result">
<attribute name="serviceVersion" type="unsignedInt" use="required"/>
  </complexType>
```

[FIG. 8]

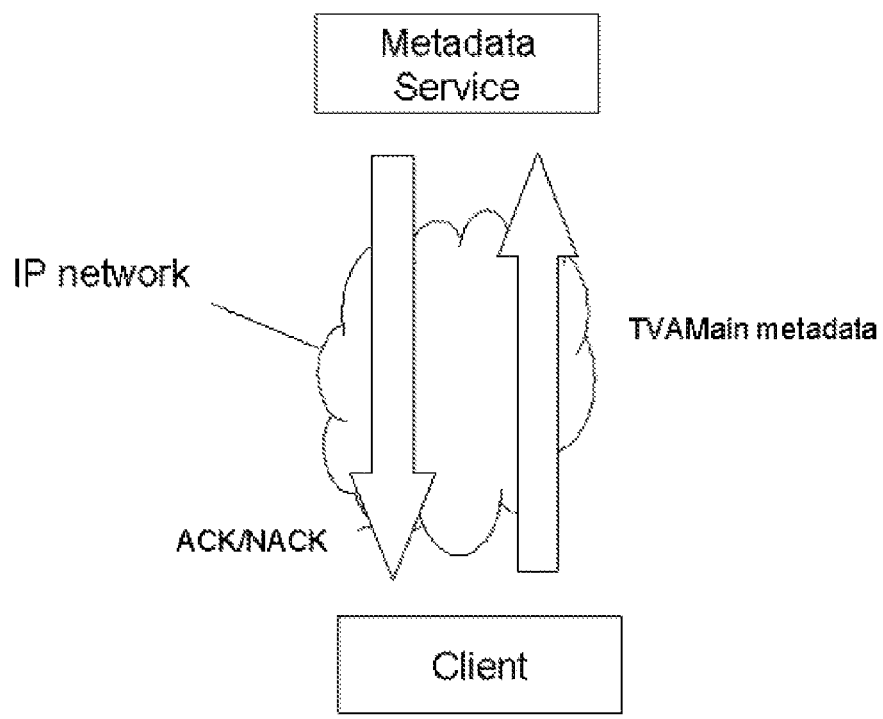

[FIG. 9]

```
<element name="upload_Personal_Data" type="tns:upload_Personal_DataType"/>
<complexType name="upload_Personal_DataType">
  <sequence>
    <element name="UserInformation" type="tva2:ExtendedUserDescriptionType"/>
  </sequence>
</complexType>
```

[FIG. 10]

```
<element name="upload_Personal_Data_Result" type="tns:upload_Personal_Data_ResultType"/>
<complexType name="upload_Personal_Data_ResultType">
<attribute name="serviceVersion" type="unsignedInt" use="required"/>
    <attribute name="status" use="required">
        <simpleType>
           <restriction base="string">
              <enumeration value="success"/>
              <enumeration value="failed"/>
           </restriction>
        </simpleType>
    </attribute>
</complexType>
```

METHOD FOR DELIVERING NON-ANONYMOUS USER METADATA USING AN SOAP OPERATION IN TV ANYTIME METADATA SERVICE

RELATED APPLICATIONS

This is a continuation of application Ser. No. 11/192,280 filed Jul. 29, 2005 and now allowed, which claims priority from Korean Application Nos. 10-2004-0116702, filed on 30 Dec. 2004 and 10-2005-0025886, filed on 29 Mar. 2005, which are herein expressly incorporated by reference in its entirety.

BACKGROUND OF THE INVENTION

1. Field of the Invention

The present invention relates, in general, to a TV-Anytime service and, more particularly, to a method for delivering non-anonymous user metadata using a SOAP operation in the TV-Anytime metadata service.

2. Description of the Related Art

Recently, as a digital broadcasting service has become popularized, research into technology for providing a customized broadcasting service in a multichannel multimedia environment has been actively carried out. For example, TV-Anytime, which is a nonofficial international standard, is a standard for providing an anytime service of allowing a user to match his or her preferences with metadata on the basis of the metadata including description information of contents, to store desired contents, and to freely watch desired broadcast contents at any time.

As described above, metadata, which is description information about contents, includes content-based description information defined in Moving Picture Experts Group (MPEG)-7 and Electronic Program Guide (EPG) information in TV-Anytime service, and allows a user to easily search for and select desired contents. The metadata standard is composed of two parts. Part A defines a format for representing metadata, that is, a schema, and utilizes eXtensible Markup Language (XML)-based MPEG-7 Description Definition Language (DDL) [International Organization for Standardization (ISO)/International Electrotechnical Commission (IEC) 15938-2]. Part B relates to the transmission of metadata and includes a binary format (MPEG-7 BiM: Binary Format for MPEG-7) (ISO/IEC 15938-1), a fragmentation model, an encapsulation mode and an indexing method.

FIG. 1 is a view showing the configuration of TV-Anytime metadata, which includes program description metadata and user description metadata. The program description metadata includes content description metadata and instance description metadata. Metadata for a single program are interrelated via a content identifier called a Content Reference Identifier (hereinafter referred to as a "CRID").

Content description metadata is created by a content creator and includes a program title, genre, summary, critic's reviews, etc. Instance description metadata is created by a content provider and includes location [broadcast time, channel, Uniform Resource Locator (URL), etc.], usage rule, delivery parameter, etc. User description metadata includes user preference, usage history, personal bookmarks, etc., and is created by a user.

TV-Anytime standards define two-types of metadata Web services for bi-directional metadata services using a return path: one is a well-defined behavior and the other is a remote procedure for an input/output set. In eXtensible Markup Language (XML)-based Web Service Description Language (WSDL) standards, the above-described remote procedure is defined in the form of a Simple Object Access Protocol (hereinafter referred to as "SOAP") operation, and includes a "get_Data" operation used to search for metadata and a "submit_Data" operation used for user description submission. For reference, the above-described SOAP is an XML-based communication protocol enabling access to an object in a distribution environment.

Request/response types used in the TV-Anytime metadata service are defined in a namespace of "urn:tva:transport: 2002", which is provided as a tool for verifying a variety of messages. Types defined in metadata specification and content referencing standards are referred to in a transport namespace. Schema fragments are defined by the above-described namespace, and a namespace provider is defined in the form of "tns:" in the schema fragments. A perfect XML schema file has a form of tva_transport_types_v10.xsd.

1. get_Data Operation

The get_Data operation provides a function of allowing a client to search a server for TV-Anytime data about a program or a program group. Functions that can be provided by a TV-Anytime metadata provider using the get_Data operation are exemplified by the following description.

return content reference data for CRID using CRID list return TV-Anytime metadata for CRID using CRID list receive query for specific metadata attributes (for example, genre, actor, etc.) and return programs corresponding to the query return corresponding programs in response to a query for a specific time or specific channel Referring to FIG. 2 in relation to the execution of a get_Data operation, a client transmits a SOAP request message [i.e. get_Data Request element of FIG. 3] using the get_Data operation to a metadata service server through the Internet [Internet Protocol (IP) network]. At this time, the get_Data operation supports all types of queries as a rule, and provides extensive queries for metadata constraints. Then, the metadata service server returns a query result value corresponding to the SOAP request message using a SOAP response message [get Data Response element of FIG. 5].

a. Request Format

As shown in FIG. 3, a request format assigns three types of parameters to a client in the get_Data operation, and assigns an element type, returned as a query (search) result value, to the type of RequestedTables.

FIG. 4 shows an example in which the RequestedTables type, returned as a query result, is assigned to ClassificationSchemetable, ProgramInformationTable, GroupInformationTable, CreditsInformationTable, ProgramLocationTable, ServiceInformationTable, ProgramReviewTable, SegmentInformationTable, etc.

b. Response Format

As shown in FIG. 5, the response format of the get_Data operation includes 0 or at least one XML instance documents with respect to elements, such as, TVAMain, ContentReferencingTable, and InvalidFragments, and returns a query result value according to the type of RequestedTables requested in the request format.

2. submit_Data Operation

FIG. 6 shows the request/Response formats of a conventional submit_Data operation, and the operation is destined primarily to deliver data except for personalized information of users. In other words, according to TV-Anytime's phase I standard, the submit_Data operation is limited to data defined by a set of anonymous profile data created by intelligent agents based on a usage service and contents or by manual input. A TV-Anytime forum respects and includes basic rights of all users and providers, and includes private rights of content users and legal rights of all participators, such as content creators, content providers and service providers.

3. get_Data Operation Using User Information

In a current TV-Anytime service, service agents perform a get_Data operation using algorithms specific for each agent on the basis of user metadata transmitted through the submit_Data operation, and transmit corresponding results to users.

As described above, in relation to the collection of user metadata, a current TV-Anytime metadata server can collect user metadata transmitted through the submit_Data operation, and utilize the collected user metadata for statistics related to the use of contents. However, in order to provide a customized service through the service agent on the server side, the transmission of non-anonymous user information is required, but the submit_Data operation currently defined in the TV-Anytime standards basically allows only the transmission of anonymous data. Therefore, in order to provide a user customized service pursued by the TV-Anytime service, a SOAP operation capable of transmitting non-anonymous user information is acutely required.

SUMMARY OF THE INVENTION

Accordingly, the present invention has been made keeping in mind the above problems occurring in the prior art, and an object of the present invention is to provide a method for providing a personalized TV-Anytime metadata service, which provides a SOAP operation capable of transmitting non-anonymous user information, thus facilitating the provision of a customized service through a service agent.

In accordance with a first aspect of the present invention, there is provided a method of transmitting non-anonymous user metadata to a TV-Anytime service agent using a SOAP operation, comprising the steps of a) defining a SOAP operation which transmits user metadata and is capable of identifying transmission of non-anonymous user metadata; b) for the service agent, identifying a user; c) for a client, loading user metadata about the identified user on an element of the SOAP operation defined at step a) and transmitting the element with the user metadata to the service agent; and d) for the service agent, identifying the element of the SOAP operation transmitted at step c) and extracting the user metadata included in the element of the SOAP operation therefrom.

Preferably, the step a) may comprise the step of a-1) for the service agent, authenticating the user using at least one of an ID and a password of the user. Preferably, the step a-1) may be performed in a secure environment. Preferably, the step a) may comprise the step of a-2) for the service agent, allowing the user to confirm that metadata about the user is to be transmitted.

In accordance with a second aspect of the present invention, there is provided a method of transmitting non-anonymous user metadata to a TV-Anytime service agent using a SOAP operation, comprising the steps of e) providing a SOAP upload operation, a request element of which includes a user information element of extended user description type (ExtendedUserDescriptionType), and a response element of which includes version information (serviceVersion) about a metadata capability description and reception results; f) for a client, inputting non-anonymous user metadata of an authenticated user to a user information element of the request element and transmitting the non-anonymous user metadata, in response to a command from the authenticated user; and g) for the service agent, inputting version information (serviceVersion) about a metadata capability description and reception results to the response element and transmitting the version information and reception results to the client, in response to reception of the request element.

BRIEF DESCRIPTION OF THE DRAWINGS

FIG. 1 is a view showing the configuration of TV-Anytime metadata;

FIG. 2 is a conceptual view showing the typical execution of agent_Data operation;

FIG. 3 is a view showing the request format of a conventional get_Data operation;

FIG. 4 is a view showing an example of the type of RequestedTables returned as the results of a query in the conventional get_Data operation;

FIG. 5 is a view showing the response format of the conventional get_Data operation;

FIG. 6 is a view showing the request/response formats of a conventional submit_Data operation;

FIG. 7 is a view showing a request and response format of an upload_Personal_Data operation according to a first embodiment of the present invention;

FIG. 8 is a conceptual view showing the execution of the upload_Personal_Data operation according to the first embodiment of the present invention.

FIGS. 9 and 10 are views showing another request and response format of the upload_Personal_Data operation according to a second embodiment of the present invention;

DESCRIPTION OF THE PREFERRED EMBODIMENTS

Hereinafter, embodiments of the present invention will be described in detail with reference to the attached drawings.

First, the SOAP operation provided according to the present invention is allocated a name differing from that of a conventional SOAP operation so as to allow a service agent on a metadata server side to verify that metadata transmitted through the SOAP operation is non-anonymous user metadata. For example, the SOAP operation can be designated as an "upload_Personal_Data operation".

FIG. 7 is a view showing the configuration of the upload_Personal_Data operation according to a first embodiment of the present invention.

As shown in FIG. 7, the object of the upload_Personal_Data operation is to transmit UserDescription type elements in TV-Anytime service. The basic definition of the operation is the same as the submit_Data operation, but there is a difference between them in that non-anonymous information is stored. A user logs in to a service agent through an authentication procedure using his or her ID and/or password, and then transmits user information. A service agent maintains and manages user information belonging to the identified user on the basis of the transmitted user information.

In detail, the element of the upload_Personal_Data operation includes a user description element (UserDescription). In the user description element, maxOccurs="unbounded" is set, so that the number of user description elements included in the element of the upload_Personal_Data operation is not limited. Results obtained by performing the upload_Personal_Data operation are transmitted to the client through element upload_Personal_Data_Result.

FIG. 8 is a conceptual view showing the execution of the upload_Personal_Data operation according to the embodiment of the present invention.

Referring to FIG. 8, a client transmits the Request element of the upload_Personal_Data operation, including non-anonymous user information, which is TVAMain metadata, to a service agent on a metadata service server side through the Internet (IP network) using the upload_Personal_Data operation, which is a SOAP operation. In this case, the service agent must perform a user identification procedure and a user confirmation procedure about the transmission of user metadata in advance according to user identification policy and notification policy about the transmission of user information, which will be described later. Then, the service agent may identify the element of the upload_Personal_Data operation, extract user information included in a corresponding element therefrom, and transmit the results of the transmission of the user information through the above-described element upload_Personal_Data_Result.

The upload_Personal_Data operation may act according to the following policies.

1. User Identification

In order to correctly identify a user, the service agent must provide user registration and authentication procedures in a secure environment.

2. Notification of Transmission of User Information

The service agent must allow a user to confirm that the user information thereof is to be transmitted.

3. Management of User Information

The service agent must manage the leakage of user information to the outside and protect the user information using a method such as encryption. Further, when the user requests the deletion and/or changes of user information, the service agent must perform a corresponding operation.

As described above, user metadata that is transmitted through a submit_Data operation currently defined in TV-Anytime SP006 is regarded as anonymous data, but user information that is transmitted through an upload_Personal_Data operation can be processed as non-anonymous information, the user of which can be identified. Through the user information, the service agent can provide a personalized, customized service.

FIG. 9 is a view showing the request format of an upload_Personal_Data operation according to a second alternative embodiment of the present invention.

As shown in FIG. 9, the upload_Personal_Data operation according to the alternative embodiment of the present invention allows a user to transmit user information of an extended user description type ExtendedUserDescriptionType defined in TV-Anytime SP003-3 standards. That is, the input of the upload_Personal_Data operation has tva2: ExtendedUserDescriptionType defined in "Metadata Specification for Phase 2".

In the meantime, the upload_Personal_Data operation is defined similar to the above-described submit_Data operation, but there is a difference in that the upload_Personal_Data operation is used only in a reliable security environment. Further, a service provider and a user, using the upload_Personal_Data operation, assume the responsibility for the use of personal information through a user authentication procedure, etc.

FIG. 10 is a view showing an example of the response format upload_Personal_Data_Result of the upload_Personal_Data operation shown in FIG. 9.

The response result of the upload_Personal_Data operation must indicate information about the current service version serviceVersion. For this operation, an attribute of the serviceVersion is designated as a required item ("required"). The purpose of this is to prevent capability description information from being downloaded each time the upload_Personal_Data operation is used.

Further, the response of the upload_Personal_Data operation must include the status of reception of personal information. The status is indicated in the form of "success" or "failed", as shown in FIG. 17.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting user metadata about a non-anonymous user of a TV-Anytime service from a client of the TV-Anytime service to a service agent of the TV-Anytime service, the method comprising:
    a) providing a simple object access protocol (SOAP) upload operation, a request element of which includes a user information element of an extended user description type, and a response element of which includes version information about a metadata capability description and reception results;
    b) at the client, inputting the user metadata of an authenticated non-anonymous user to the user information element of the request element and transmitting the user metadata, in response to a command from the authenticated non-anonymous user, the request element including a request of the non-anonymous user to change user information about the user stored at the service agent;
    c) at the service agent, receiving the request element;
    d) at the service agent, inputting the version information about the metadata capability description and reception results to the response element and transmitting the version information and the reception results to the client, in response to the request element; and
    e) at the service agent, changing the user information about the user.

2. A method of transmitting user metadata of a non-anonymous user of a TV-Anytime service, the method comprising:
    a) providing a simple object access protocol (SOAP) upload operation, a request element of which includes a user information element of an extended user description type, and a response element of which includes version information about a metadata capability description and reception results;
    b) inputting the user metadata of an authenticated non-anonymous user to the user information element of the request element and transmitting the user metadata, in response to a command from the authenticated non-anonymous user, the request element including a request of the non-anonymous user to change user information about the user stored at a service agent of the TV-Anytime service;
    c) receiving the request element; and
    d) inputting the version information about the metadata capability description and reception results to the response element and transmitting the version information and the reception results to the client, in response to the request element; and
    e) at the service agent, changing the user information about the user.

3. The method of claim 1, wherein the user metadata of the non-anonymous user corresponds to user description metadata and comprises at least one of user preference, usage history, and personal bookmarks.

4. The method of claim 1, wherein the SOAP operation is titled in a different name compared to another SOAP operation which element includes user metadata about an anonymous user so that the service agent discriminates the SOAP operation from the other SOAP operation by the different name.

5. The method of claim 1, wherein the reception results transmitted in operation d) indicate whether the transmitting the user metadata performed at operation b) is successful or not, without showing a change of the TV-Anytime service according to the changing the user information about the user.

6. The method of claim 2, wherein the reception results transmitted in operation d) indicate whether the transmitting the user metadata performed at operation b) is successful or not, without showing a change of the TV-Anytime service according to the changing the user information about the user.

* * * * *